(12) United States Patent
Ackermann

(10) Patent No.: US 6,742,637 B2
(45) Date of Patent: Jun. 1, 2004

(54) LOCK-UP CLUTCH FOR A HYDRODYNAMIC TORQUE CONVERTER

(75) Inventor: Jürgen Ackermann, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/162,979

(22) Filed: Jun. 5, 2002

(65) Prior Publication Data

US 2003/0000790 A1 Jan. 2, 2003

(30) Foreign Application Priority Data

Jun. 27, 2001 (DE) .......................... 101 31 093

(51) Int. Cl.[7] .............................................. F16H 45/02
(52) U.S. Cl. .............. 192/3.29; 192/107 R; 192/113.36
(58) Field of Search .......................... 192/3.29, 107 R, 192/113.3, 113.34, 113.35, 113.36

(56) References Cited

U.S. PATENT DOCUMENTS

| 4,523,916 | A | | 6/1985 | Kizler et al. ................. 464/98 |
|---|---|---|---|---|
| 4,986,397 | A | | 1/1991 | Vierk ........................ 192/3.29 |
| 5,215,173 | A | | 6/1993 | Gimmler .................... 192/3.3 |
| 5,456,343 | A | * | 10/1995 | Murata et al. ............. 192/3.29 |
| 5,575,363 | A | | 11/1996 | Dehrmann et al. ......... 192/3.3 |
| 5,732,804 | A | | 3/1998 | Wienholt ................... 192/3.29 |
| 5,738,198 | A | * | 4/1998 | Walth et al. ........... 192/113.36 |
| 5,799,763 | A | * | 9/1998 | Dehrmann ................. 192/3.29 |
| 5,865,283 | A | * | 2/1999 | Hirayanagi et al. ........ 192/3.29 |
| 5,979,621 | A | | 11/1999 | Schöder ..................... 192/3.29 |

FOREIGN PATENT DOCUMENTS

WO       WO 00/03158       1/2000       .......... F16H/45/02

* cited by examiner

*Primary Examiner*—Saúl Rodríguez
(74) *Attorney, Agent, or Firm*—Cohen, Pontani, Lieberman & Pavane (57) ABSTRACT

A lock-up clutch for a hydrodynamic torque converter has at least one friction area on a first converter component, which area can be brought into working connection with at least one opposing friction area on a second converter component by an engaging movement of this converter component or which can be separated from this opposing friction area by a disengaging movement in the direction opposite that of the engaging movement. On at least one of the two converter components, a pump device acting in either the friction area or in the opposing friction area is present, which, as a result of its geometric shape, has the effect of building up a pressure gradient, by means of which a forced flow of hydraulic fluid through at least one predetermined section of the friction area and/or of the opposing friction area is produced.

35 Claims, 8 Drawing Sheets

LOCK-UP CLUTCH FOR A HYDRODYNAMIC TORQUE CONVERTER

BACKGROUND OF THE INVENTION

1. Field of the Invention

The invention pertains to a lock-up clutch with at least one friction area on a first converter component, which can be shifted into working connection with at least one opposing friction area on a second converter component by an engaging movement, or which can be separated from this opposing friction area by a disengaging movement in the direction opposite that of the engaging movement.

2. Description of the Related Art

U.S. Pat. No. 5,215,173 discloses a lock-up clutch for a hydrodynamic torque converter with a piston, which, as shown in FIGS. 1 and 2, carries a friction lining on the side facing a converter cover; the side of this lining which faces away from the piston serves as a friction area. The piston can be moved toward the converter cover to engage the lock-up clutch or away from it to disengage the clutch. As soon as the friction area of the friction lining makes contact with the converter cover, the corresponding contact surface of the latter serves as the opposing friction area. The piston serves as the first converter component, and the converter cover serves as the second converter component of the lock-up clutch.

As soon as the friction lining of the piston comes into contact with the converter cover the rotational movement of the converter housing around its rotational axis is no longer transmitted to the transmission input shaft via a hydrodynamic circuit with an impeller, a turbine wheel, and a stator; instead, the movement is transmitted directly to the shaft by means of the lock-up clutch.

The use of a lock-up clutch may be advantageous from the standpoint of energy efficiency, but in this operating state the lock-up clutch should be used to damp the torsional vibrations which may have been introduced along with the torque. For this reason, the piston of the lock-up clutch is connected by a torsional vibration damper to the transmission input shaft; the torsional vibration damper has stored-energy elements to absorb elastically the torsional vibrations. In designs of lock-up clutches without torsional vibration dampers, such as that shown in FIGS. 3 and 4 of the same Offenlegungsschrift, however, the pressure which presses the piston against the converter cover is reduced so that the piston can make a desirable slipping movement. Although this slippage may serve effectively to damp the introduced torsional vibrations, it allows in return a considerable amount of heat to build up in the friction area and in the opposing friction area. This principle of lock-up clutch operation with controlled slippage can be realized both with a so-called single-WK (single torque circuit) design according to FIGS. 1 and 2 and also with a double-WK design according to FIGS. 3 and 4, these two designs differing from each other only with respect to the number of friction linings. In the case of the double-WK design, however, the friction linings are preferably attached nonrotatably but with freedom of axial movement to a clutch disk located axially between the converter cover and the piston.

Regardless of the number of friction linings and accordingly of the number of friction areas and opposing friction areas, the previously mentioned buildup of heat caused by slippage makes it necessary to take measures to ensure that this heat can be carried away as quickly as possible from the working area of the lock-up clutch. In U.S. Pat. No. 5,215,173, this is done by thermal conduction through the metal as a result of the temperature gradient which exists between the origination point of the heat and the other areas of the hydrodynamic torque converter through which hydraulic fluid is flowing. When large amounts of frictional work are performed, however, this type of cooling is no longer sufficient, which means that the friction linings will become overheated and that the hydraulic fluid passing over them will deteriorate.

U.S. Pat. No. 5,575,363 discloses an elaboration in this regard. FIGS. 14–17 in particular show systems of grooves either in the friction linings or at least in one of the two converter components, i.e., in the converter cover or in the piston. These grooves make it possible for hydraulic fluid to flow from the radially outer area toward the radially inner area. As shown in FIG. 1 of this patent, the hydraulic fluid can be carried away through channels provided for the purpose to the rotational center of the hydrodynamic torque converter and thus conveyed out of the converter circuit. The disadvantage, however, is that the grooves offer relatively high resistance to the flow of the fluid; this can be caused, first, by comparatively small flow cross sections of the grooves and, second, by long travel distances in the grooves. A high pressure difference must therefore be built up so that a sufficiently high volume flow rate of hydraulic fluid through the grooves can be obtained in spite of the previously mentioned high flow resistance. As a result, lifting forces which try to lift the piston also develop axially between the converter cover and the piston, and to counteract them it is necessary to apply higher contact pressures. Precisely when high torques are being transmitted, therefore, a considerable amount of energy must be expended to maintain this cooling process.

It is also extremely difficult to lay out the flow cross sections and the lengths of these grooves in such a way that the precise pressure difference required to force the hydraulic fluid through them is obtained. An advantageous solution to this problem is described in U.S. Pat. No. 5,732,804, according to which the length of the grooves is reduced and their cross sections are made relatively large. At least one throttle point is provided, which can be used to adjust the volume flow rate. This throttle point preferably passes through at least one of the friction linings in the axial direction. But even this solution with its advantageous engineering design still provides only a limited cooling action.

Systems of grooves in the friction lining have also become known in which each individual groove has both its inflow and its outflow points on the same radial side of the friction lining, whereas the friction lining also has a friction area radially outside these grooves. This radially outer friction area is closed in the circumferential direction and is intended to prevent a possible pressure-induced leak-through of hydraulic fluid from the radially outer area inward toward the radially inner area. This design of a groove system, shown by way of example in U.S. Pat. No. 4,986,397, may indeed reduce any tendency of the piston to be lifted from the converter cover assigned to it when the pressure of the fluid flowing through the grooves builds up, but on the other hand it suffers from the disadvantage that the flow through each individual groove occurs exclusively by reason of shear forces in the hydraulic fluid, these shear forces being caused by the relative velocity between the limiting surfaces. The conveyed volume flow rate is therefore low, and, in addition, some of the hot hydraulic fluid forced out of the groove which precedes in the circumferential direction is taken up again by the groove which follows in the circumferential direction. The cooling effect which can be achieved is thus correspondingly low.

SUMMARY OF THE INVENTION

The invention is based on the task of designing the friction area of the lock-up clutch of a hydrodynamic torque converter in such a way that a highly effective cooling action can be obtained in the friction area while good energy efficiency is provided at the same time.

This task is accomplished according to the invention by providing a pump on at least one of the converter components, the pump acting in the friction area or in the opposing friction area, namely, a pump with a geometric design which allows it to generate a pressure gradient, it is possible to force the flow of hydraulic fluid through at least one predetermined section, of the friction area and/or of the opposing friction area.

Thus the pump device can have a baffle element, for example, which projects into the flow path of the hydraulic fluid and causes turbulence to develop in at least certain parts of the fluid. As a result of this turbulence, the hydraulic fluid which has just flowed through the circumferentially preceding groove and thus become hot is mixed much more effectively with other hydraulic fluid which is present a greater distance away from the friction lining and is correspondingly cooler. Because of this intensive mixing, a hydraulic fluid is obtained which, by reason of its temperature, is able to carry away considerable amounts of heat from the circumferential following groove as the fluid flows through the grooves. In addition, because of the baffle element arranged in the flow path of the hydraulic fluid, it is ensured that a comparatively high volume flow rate is directed into the groove, so that, in the inflow area of the groove, a considerable dynamic pressure is built up, as a result of which the volume flow rate through the groove is significantly increased. This effect can be increased even more by providing the inflow to the groove with a cross section larger than that of the rest of the groove, so that the volume flow rate of the newly arriving, cooler hydraulic fluid quickly forces the heated hydraulic liquid already in the groove out of the groove. If this inflow to the groove is also made as free of edges as possible, the problem of a possible separation of the arriving flow can be reduced, and the turbulence can be increased in the inflow area of the groove as well.

The function of a pump device can also be assumed by a displacement body, provided on at least one of the two converter components in the area where the one converter component comes in contact with the groove in the other converter component, this displacement body fitting at least partially into this groove, thus narrowing its flow cross section. As a result of the relative motion between the two above-mentioned converter components in the circumferential direction with respect to each other, the displacement body has the effect of producing the desired forced flow through the groove, where, as a result of the flow resistance in the groove, the pressure reaches a maximum at a point which is immediately ahead of the displacement body in terms of the direction of motion and then decreases to a minimum behind the displacement body. Through the proper selection of the cross section of the grooves, the flow resistance in the groove system can be adjusted in such a way that a part of the flow volume is forced out of the groove system, while fresh hydraulic fluid is drawn in on the other side. Obviously, this inventive solution is not limited to an individual displacement body; on the contrary, it can be enhanced by the use of several such displacement bodies.

Another way in which the pump device can be designed involves the creation of an eccentricity between the friction area and the opposing friction area and to enclose this eccentricity area with a seal extending radially around the outside. Relative movement between the friction area and the opposing friction area thus leads to the formation of a revolving displacer volume, so that every possible point of the friction area and of the opposing friction area is, wetted with hydraulic fluid during each revolution, as a result of which a superior cooling effect can be obtained. An especially characteristic feature of this solution is that the friction area and the opposing friction area approach each other to form a point of minimum separation distance. The pressure differences required for this principle to work are created in front of and behind this point, which is called the dynamic pressure point; in a preferred embodiment, these differences can be used to generate a volume flow rate through a lining provided with grooves. It is especially preferable for this system of grooves to have a zigzag or meander-shaped form or to have a waffle-shaped groove system. Because of the previously mentioned revolving wetting process, however, it is not absolutely necessary for the sake of the above-mentioned principle that the friction area or the opposing friction area be formed in one of these ways.

The previously mentioned point where the minimum radial distance is present between the friction area and the opposing friction area can be provided on the radially outer side of the friction linings, but it is equally possible to provide it on the radially inner side or even on both radial sides. For this purpose, preferably an area projecting in the axial direction is provided on the converter component without a friction lining, this axial extension enclosing the radially adjacent friction lining radially from the outside or approaching it radially from the inside. A design is conceivable here in which each of the axial extensions is in the form of a ring, whereas the associated friction lining has an elliptical shape. Nevertheless, this type of design variant should be limited to the use of lock-up clutches which have an even number of friction linings, so that, by arranging them with an angular offset with respect to each other, they can compensate for radial vibrations caused by the elliptical shape of the friction linings and thus successfully avoid any balance errors which may otherwise occur.

Exemplary embodiments of the invention are explained in greater detail below on the basis of a drawing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 7 is a top view of one of the friction linings along intersecting line VII—VII in FIG. 6a;

DETAILED DESCRIPTION OF THE PRESENTLY PREFERRED EMBODIMENTS

Figures 1, 1A:
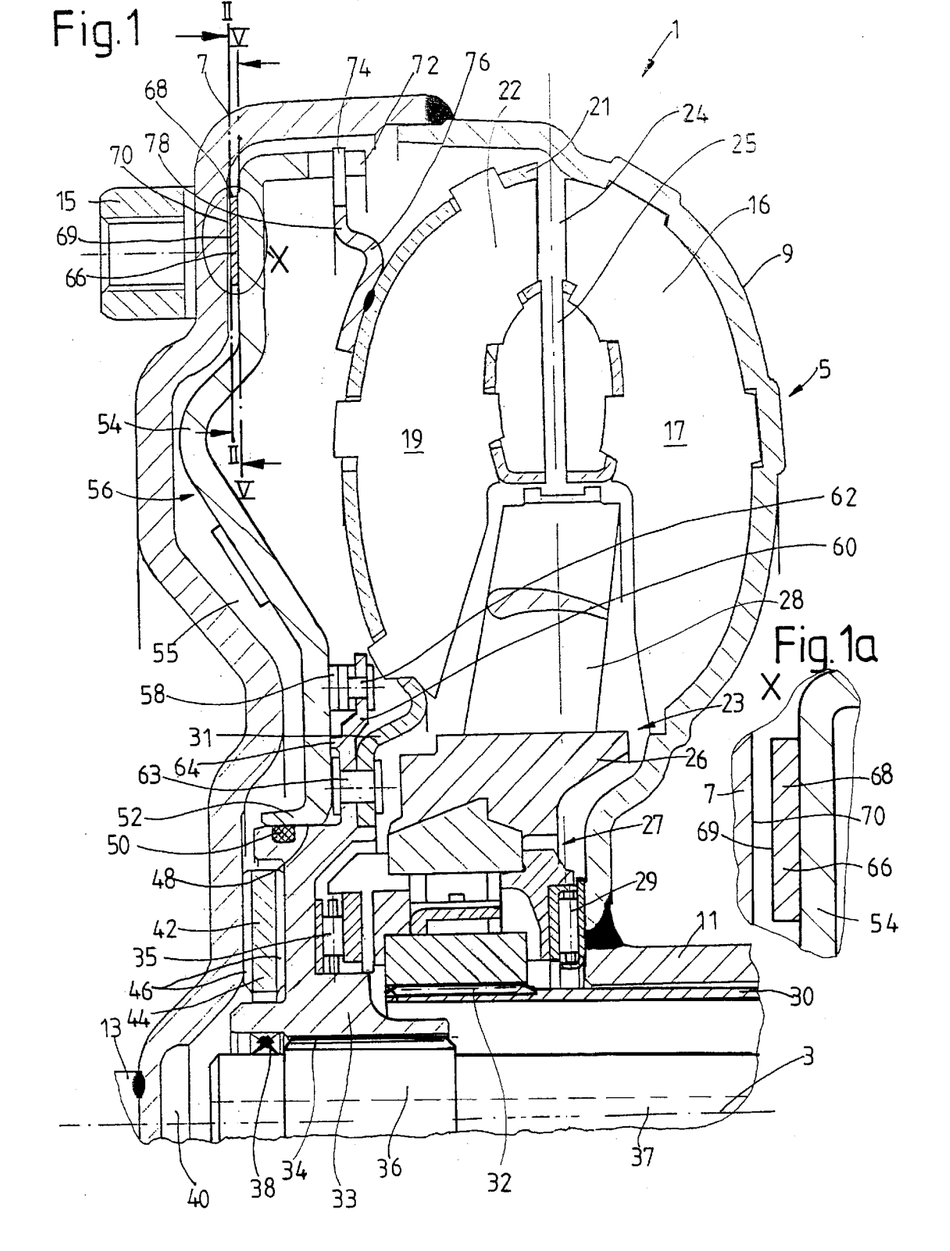
FIG. 1 shows the upper half of a longitudinal section through a hydrodynamic torque converter with lock-up clutch, which has a single friction lining, as indicated by the detail marked "X"
FIG. 1a is an enlarged view of detail X in FIG. 1.

FIG. 1 shows a hydrodynamic torque converter 1, which is able to rotate around a rotational axis 3. The hydrodynamic torque converter 1 has a converter housing 5 with a converter cover 7 on the side facing a drive (not shown), such as an internal combustion engine. The converter cover is rigidly connected to an impeller shell 9. The impeller shell is extended at the radially inner end to form an impeller hub 11.

To return to the converter cover 7, this has in the radially inner area a bearing journal 13, which, in a manner known in itself and therefore not explained in detail, is mounted on an element of the drive such as a crankshaft, which therefore centers the converter housing 5 on the drive side. The converter cover 7 also has an attachment seat 15, which is the conventional means for attaching the converter housing 5 to the drive, preferably by way of a flex plate (not shown). Reference is made by way of example to FIG. 1 of U.S. Pat. No. 4,523,916, which shows how the bearing journal of a torque converter is mounted on the crankshaft of a drive and how the torque converter is connected by way of a flex plate to the crankshaft.

The previously mentioned impeller shell 9 and the impeller vanes 16 together form in impeller 17, which works together with a turbine wheel 19, which consists of a turbine wheel shell 21 and turbine wheel vanes 22, and also together with a stator 23. The impeller 17, the turbine wheel 19, and the stator 23 form in a manner known in and of itself a hydrodynamic circuit 24, which encloses an internal torus 25.

It should also be mentioned that the stator vanes 28 of the stator 23 are attached to a stator hub 26, which is mounted on a free-wheel 27. The latter is braced axially by an axial support 29 against the impeller hub 11 and is connected nonrotatably but with freedom of axial movement by a gear-tooth system 32 to a support shaft 30, which is located radially inside the impeller hub 11. The support shaft 30, designed as a hollow shaft, for its own part encloses a transmission input shaft 36, which is provided with a central bore 37 to allow the passage of hydraulic fluid. The transmission input shaft 36 is connected nonrotatably but with freedom of axial movement to a turbine hub 33 by means of a gear-tooth system 34, where a radially outer area of this turbine hub 33 provides a place for the attachment of a turbine wheel base 31. The turbine hub 33 is braced on one side by an axial support 35 against the previously mentioned free-wheel 27 and rests on the other side by way of an axial support 44 against the converter cover 7. Radially toward the inside, the turbine hub 33 is sealed off against the transmission input shaft 36 by a seal 38.

The previously mentioned central bore 37 in the transmission input shaft 36 serves to supply the hydrodynamic circuit 24 and to apply pressure to a lock-up clutch 56, to be explained below, for which purpose connections to a control device and to a supply of hydraulic fluid are required. Neither the control device nor the hydraulic fluid reservoir are shown in the drawing, but they can be seen in FIG. 1 of previously cited U.S. Pat. No. 5,575,363, the content of which is incorporated herein by reference.

Hydraulic fluid which has entered via the central bore 37 of the transmission input shaft 36 arrives in a transition space 40, and from this space it passes radially outward via channels 46 in the axial support 44, which serves as a flow passage 42, to a chamber 55, located axially between the converter cover 7 and a piston 54 of the previously mentioned lock-up clutch 56. The piston 54 is centered with respect to the converter cover 7. The side of the piston facing away from the chamber 55 is directed toward the hydrodynamic circuit 24 and, as a function of the pressure conditions in the hydrodynamic circuit 24 and in the chamber 55, it can move between two different limit positions, which will be discussed further below. The piston 54 can be shifted axially by means of a piston base 52, supported on the turbine hub 33, where a piston seal 50 recessed into the turbine hub 33 exercises its sealing function against the base 52 of the piston. In the radially inner area of the piston 54, the piston is attached via tangential leaf springs 58 and by a riveted joint 62 to a holding device 60, which is designed as a single piece with the turbine hub 33 and which is connected by another riveted joint 63 to the base 31 of the turbine wheel 19.

The piston 54 is provided on its outside circumference with a plurality of openings 72 proceeding in the circumferential direction, these openings being connected to opposing openings 74 in an anti-rotation lock 76. The latter is attached in turn to the turbine shell 21. It remains to be pointed out that the piston is connected nonrotatably but with freedom of axial movement to the anti-rotation lock 76 via the openings 72/opposing openings 74.

In the radially outer area, on the side facing the converter cover 7, the piston 54 carries a friction lining 68, which encloses the rotational axis 3 like a ring and which, on the side facing away from the piston 54, referred to below as the friction area 69, can be brought into friction-locking connection with an opposing friction area 70 provided on the converter cover 7, when the pressure in the hydrodynamic circuit 24 is higher than that in the chamber 55 on the opposite side of the piston 54. Friction area 69 and opposing friction area 70 are emphasized in FIG. 1a and will be explained later in greater detail.

In a manner known in and of itself, the piston 54 can move axially between two possible limit positions, the first limit position being reached when the friction lining 68 comes into contact by its friction area 69 in a friction-locking manner with the opposing friction area 70. The second limit position, however, is reached when the pressure in chamber 55 is greater than that in the hydrodynamic circuit 24 and the piston 54 is thus shifted axially until it comes into contact with a stop 64 on the holding device 60, this movement being performed against the action of the tangential leaf springs 58, which try to push the piston 54 toward the converter cover 7.

Figure 2:
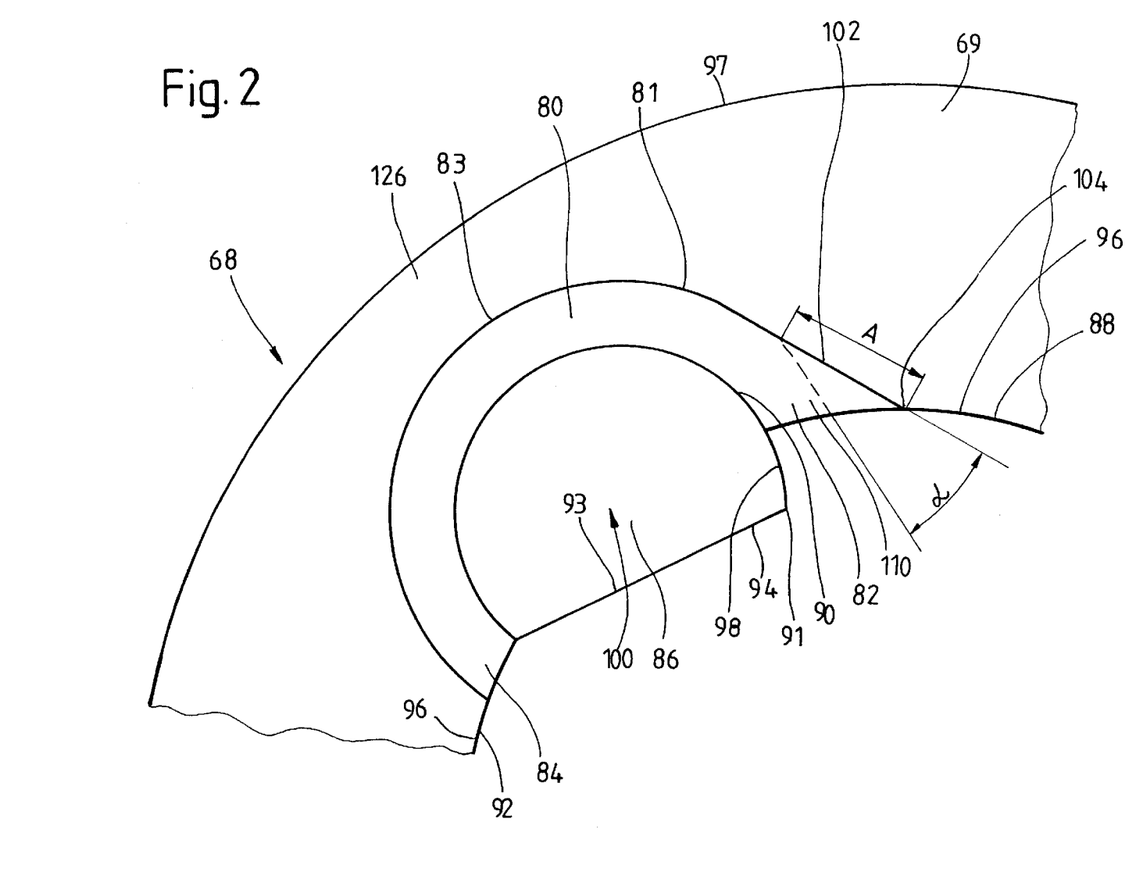
FIG. 2 is a top view of a segment of the friction lining along intersecting line II—II in FIG. 1 with a baffle element serving as a pump device.

To return to detail "X", we can see that an intersecting line II—II (FIG. 1) is drawn through it. Looking in the direction indicated by this intersecting line, we see the friction lining 68 as shown in FIG. 2 in the form of an enlarged isolated drawing of a segment of this friction lining 68. This segment of the friction lining 68 has a groove 80, which extends essentially in the form of an arc in the friction lining. Each groove proceeds first from an inflow area 82 on the radially inner side 96 of the friction lining 68 toward the radially outer area, and then, having reached a crest point 83, goes back in the radially inward direction again, namely, to an outflow area 84, which, like the inflow area 82, opens out on the radially inner side 96 of the friction lining 68. In a groove of this design, a groove-free friction ring 126, which exerts a certain sealing effect while the friction lining 68 is in contact with the converter cover 7, remains intact in the radially outer area of the friction lining 68, that is, radially between the crest point 83 and the radially outer side 97.

The design of the radially inner side 96 of the friction lining 68 is examined more closely below. The following description starts on the right side in FIG. 2 under the assumption that the friction lining 68 and thus the piston holding it rotate in the direction which allows the area of the friction lining 68 on the right of the groove 80 to act as the inflow side 88 and the area on the left of the groove 80 to act as the outflow side 92. Accordingly, based on FIG. 2, the friction lining 80 rotates in the clockwise direction. In the circumferential direction between the inflow area 82 and the outflow area 84 of the groove 80, a baffle element 86 is provided, which has a guide surface 90 facing the inflow side 88. This surface has the ability to deflect hydraulic fluid arriving from the inflow side into the groove 80. The guide surface 90 of the baffle element 86 projects radially toward the inside, preferably with the same curvature as that of the groove 80 itself, extending beyond the radially inner side 96 of the friction lining 68. After reaching its endpoint, which serves as a separation edge 91 for the flow, it proceeds back toward the outflow side 92, returning to the radial level of the radially inner side 96 of the friction lining 68. This radially outward-extending area of the baffle element 86 serves as a turbulence generator 94, because the hydraulic fluid diverted radially inward by the guide surface 90 attempts, as a result of centrifugal force, to flow radially back outward again behind the separation edge 91 of the baffle element 86. This obviously does not succeed all at once but only after a turbulence region has been traversed, after which the hydraulic fluid can reach the flow guide side 93 of the baffle element 86 a certain distance behind the separation edge 91 and then continue to flow onward toward the outflow side 92.

With respect to the inflow area 82 of the groove 80, the guide surface 90 of the baffle element 86 is assisted by a dynamic pressure generator 102, which preferably is formed by extending the radially outside wall 81 of the groove 80, preferably without any curvature, over a predetermined radial distance A from the radially inner side 96 of the friction lining 68, so that the groove opens out on the radially inner side 96 of the friction lining 68 with a nearly edge-free transition 104. As a result, the inflow area is expanded by an amount essentially equal to the angle alpha.

The dynamic pressure generator 102, in combination with the guide surface 90 on the baffle element 86, has the effect of forcing the hydraulic fluid arriving from the inflow side into the inflow side 88 of the groove 80, during which the dynamic pressure increases as a result of the increasing constriction of the cross section of the groove 80. As a result, a forced flow is produced in the groove 80, which means that the hydraulic fluid already present in the groove 80 —fluid which has become heated in the meantime—is forced out of the groove 80 via the outflow area 84 on the outflow side. Simultaneously, a portion of the hydraulic fluid arriving at the inflow side is conducted along the baffle element 86, thus bypassing the groove 80, as a result of the radially inward-projecting radial extension 98. Some of this hydraulic fluid can be coolant which has already flowed through a groove preceding the present one and which accordingly has already been heated up to some extent. It can therefore be advantageous for only a portion of this hydraulic fluid to enter the groove 80.

In summary, the baffle element 86, in cooperation with the dynamic pressure generator 102, serves as a pump device 100, which, as a result of the forced flow generated in the groove 80, causes the heated hydraulic fluid to be forced out of the groove and also prevents the already heated hydraulic fluid from flowing through this groove 80. Instead, the strong turbulence in the inflow area 82 causes the hydraulic fluid already heated by passage through preceding grooves to mix vigorously with fresh, newly arriving hydraulic fluid, and it is this relatively cool hydraulic fluid which is forced into the groove 80.

In regard to the present embodiment, it should be mentioned in conclusion that the baffle element 86 can be designed as a single piece with the rest of the friction lining 68. The tool for stamping out the friction lining 68 from a sheet of friction lining material must therefore be designed with a circular shape on the radially outer side 97 but with a shape which conforms to the baffle element 86 on the radially inner side 96. When a friction lining 68 is stamped out in this way, the groove 80 can be produced in a manner known in and of itself as described, for example, in U.S. Pat. No. 5,979,621. It would also be possible, however, for the baffle element 86 to be produced as a separate element and then attached by the use of an adhesive, for example, to the friction lining 68, which has been stamped out in the form of a ring on both the radially outer and inner sides. In this case a recess is preferably introduced into the friction lining 68, which can be formed together with the groove 80 and which then serves as a receptacle for the baffle element 86 to be bonded to the lining.

Figures 3, 4:
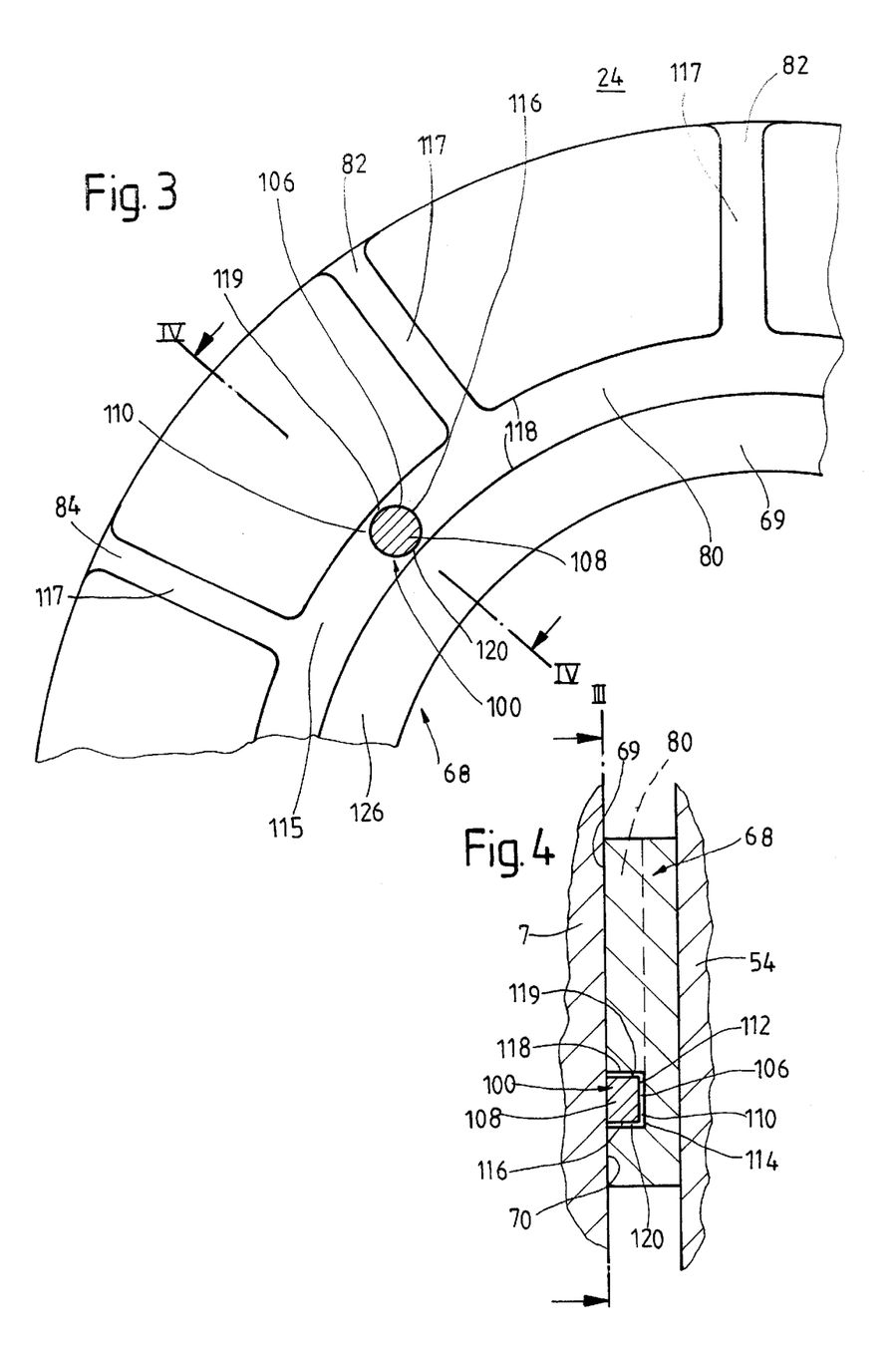
FIG. 3 is similar to FIG. 2, but it shows a displacement body as the pump device.
FIG. 4 is a view along intersecting line IV—IV of FIG. 3.

Like FIG. 2, FIG. 3 shows a segment of the friction lining 68, but here the lining has a different design for the groove 80. So that the principle according to FIG. 3 can be correctly understood, it should be studied together with FIG. 4, because it can be seen from FIG. 4 that a displacement body 108, acting as a pump device 100, is provided on one of the converter components, in the present case on the converter cover 7. The displacement body 108 can be designed as a single piece with the converter cover 7, but it can also be produced as a separate element and then attached later to the converter cover 7. Essential to the function of the displacement body 108 is that it engages in the groove 80 on the radially inner side of the groove 80 of the friction lining 68 in such a way that it reduces the flow cross section 110 of the groove 80 at this point. To illustrate this, FIG. 4, which shows an enlarged isolated drawing of detail X in FIG. 1a, shows the displacement body 108 with one free end 112, which fits into the groove 80 with a predetermined amount of axial clearance 106 with respect to the base 114 of the groove. A predetermined amount of radial clearance 119, 120 also remains between the outside circumference 116 of the displacement body 108 and the associated side walls 118 of the groove 80. The principle by which this pump device 100 works is based on the fact that the displacement body 108 is attached to one of the converter components, such as the converter cover 7, whereas the friction lining 68 is attached to the other converter component, which, in the present case, would therefore be the piston 54. As soon as relative rotation occurs between the two converter components 7 and 54 as a result of slippage, for example, the displacement body 108 is shifted in the circumferential direction within the circumferential area 115 of the groove 80. One side thus pushes a volume of hydraulic fluid ahead of it, so that fresh hydraulic fluid is drawn in on the opposite side by the resulting negative pressure. In this way, for example, hydraulic fluid which has entered via inflow areas 82 of the groove system 80 and arrived via radial areas 117 of the groove system 80 in the circumferential area 115 is drawn in from the radially outer hydrodynamic circuit 24, whereas the displacement body 108 forces the heated hydraulic fluid already in the circumferential area 115 of the groove system 80 through at least one radial area 117 of the groove system 80 and the outflow area 84 back out into the hydrodynamic circuit 24. Relative movement of the two converter components 7, 54 with respect to each other thus brings about forced flow in the groove system 80 and thus a more intensive flow through the grooves. Of course, the turbulence-caused mixing of heated hydraulic fluid with newly arriving fresh hydraulic fluid plays a role here, too, because velocity differences are induced in the hydraulic fluid as a result of pressure differentials, especially in the inflow and outflow areas of the groove systems 80.

Figure 5:
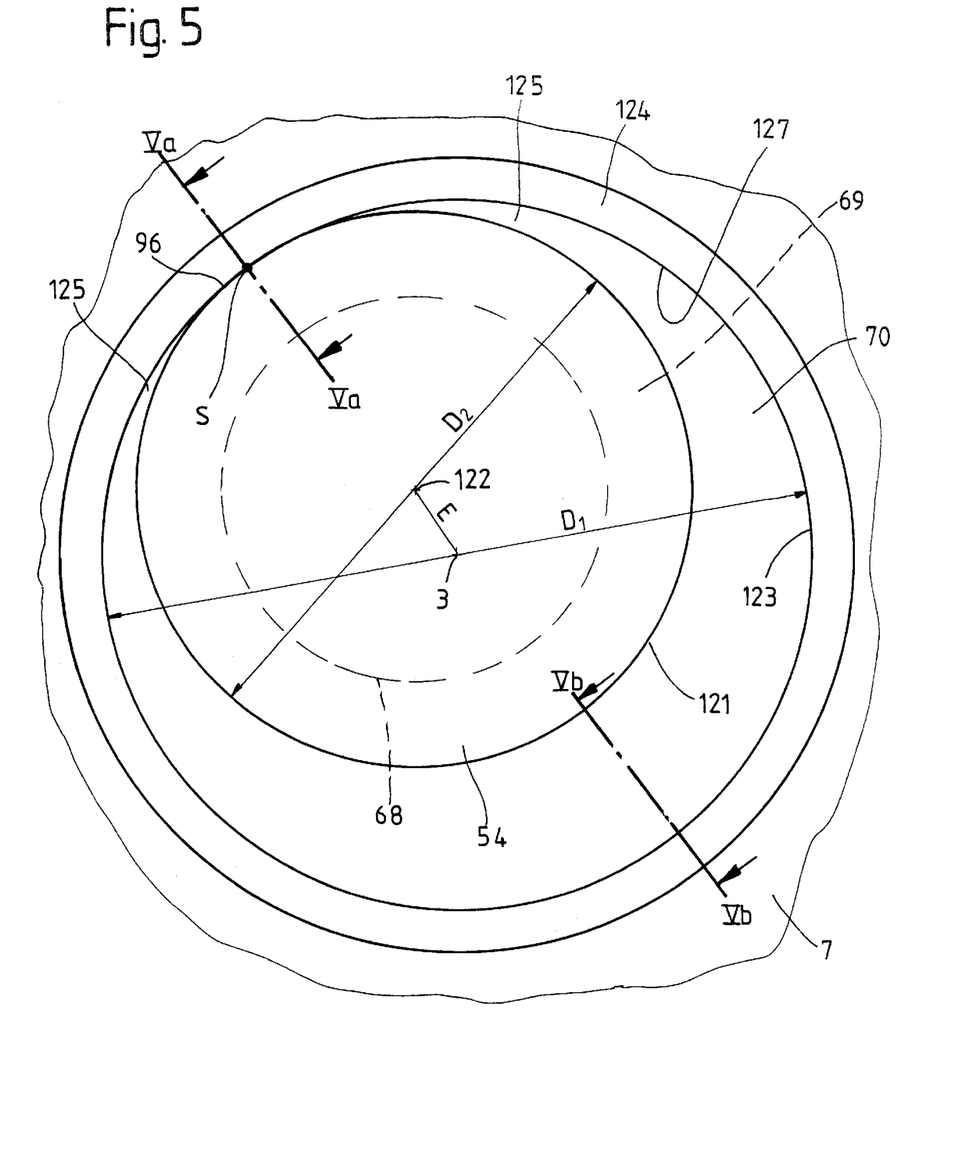
FIG. 5 is a top view along intersecting line V—V in FIG. 1 with two converter components arranged eccentrically with respect to each other and with a revolving dynamic pressure point as pump device.
Figure 5A:
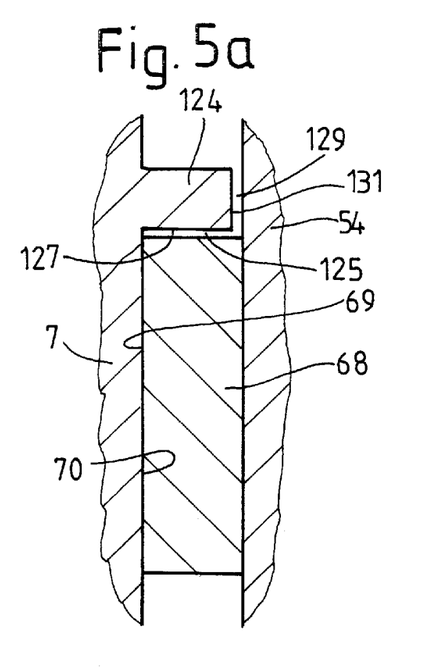
FIG. 5a is a view along intersecting line Va—Va in FIG. 5.
Figure 5B:
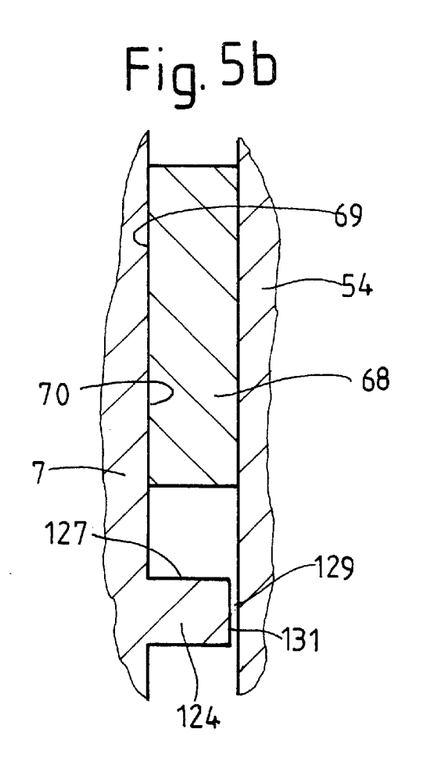
FIG. 5b is a view along intersecting Vb—Vb in FIG. 5.

Another active principle is shown in FIG. 5 in conjunction with FIGS. 5a and 5b, which, looking in the direction of line V—V of FIG. 1, show a section of the converter cover 7 and a piston 54. Characteristic of this design is an outer ring-shaped ridge 124, which is provided on the converter cover 7 and which projects toward the piston 54. This ring-shaped ridge extends axially over part of the axial dimension of the friction lining 68. FIGS. 5a and 5b, which are views along intersecting lines Va—Va and Vb—Vb in FIG. 5, make it easy to understand this axial arrangement. The figures show the design of the outer ring-shaped ridge 124 on the converter cover 7 and the attachment of the friction lining 68 to the piston 54 very clearly. It can also be clearly seen that the outer ring-shaped ridge 124 rests almost without clearance radially against the friction lining 68 at point Va to form a dynamic pressure point S in a manner to be explained in more detail below. Conversely, at point Vb, there remains a considerable radial gap. In the axial direction, there remains a residual gap 129 between the axially free end 131 of the outer ring-shaped enclosure 124 and the piston 54, even when the lock-up clutch 56 is closed.

To return to FIG. 5, we can see that the outer ring-shaped enclosure 124 encloses an opposing friction area 70, which has a comparatively large diameter D1. Conversely, the outside edge of the friction area 69 of the friction lining 68 has a much smaller diameter D2. The piston 54, contrary to the design shown in FIG. 1, has a central axis 122 which is separated from the rotational axis 3 of the converter cover 7 by an eccentricity E. When relative movement occurs in the circumferential direction between the two converter components 7, 54 the dynamic pressure point S will shift in the circumferential direction, moving along the radially inner side 127 of the outer ring-shaped enclosure 124, and thus narrowing the flow gap 125 on the leading side, i.e., on the side facing in the direction of motion, and expanding it on the opposite side. In this way, a positive pressure is produced on the leading side of the dynamic pressure point S and a negative pressure on the trailing side. To this extent, the design according to FIG. 5 involves another type of pump device 100, which is responsible for creating a pressure-induced forced flow of hydraulic fluid in the action area of the friction lining 68. In contrast to the preceding type, however, the friction area 69 covers and uncovers continuously changing areas of the opposing friction area 70, so that new areas of this opposing friction area 70 are continuously being wetted with cooling hydraulic fluid.

Figure 8:
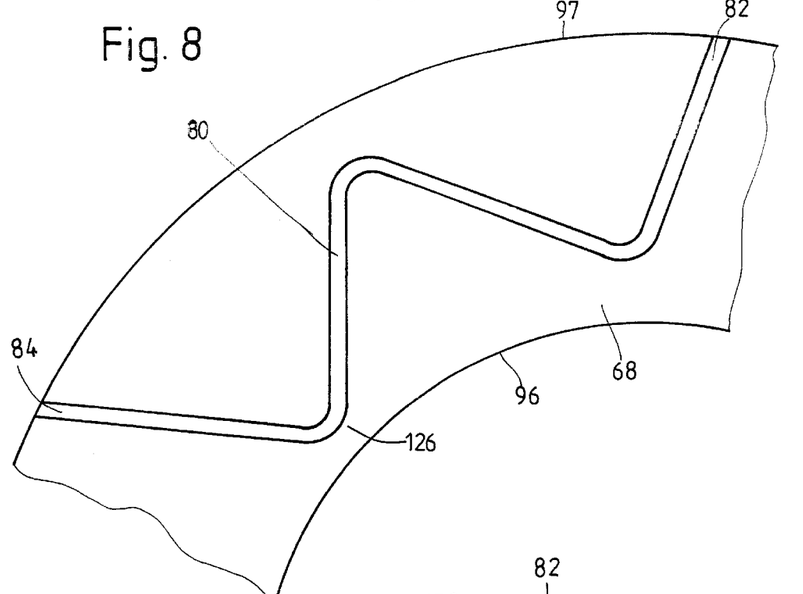
FIG. 8 is a top view of a segment of a friction lining according to FIG. 1 or FIG. 6 with a meander-shaped groove system.
Figure 9:
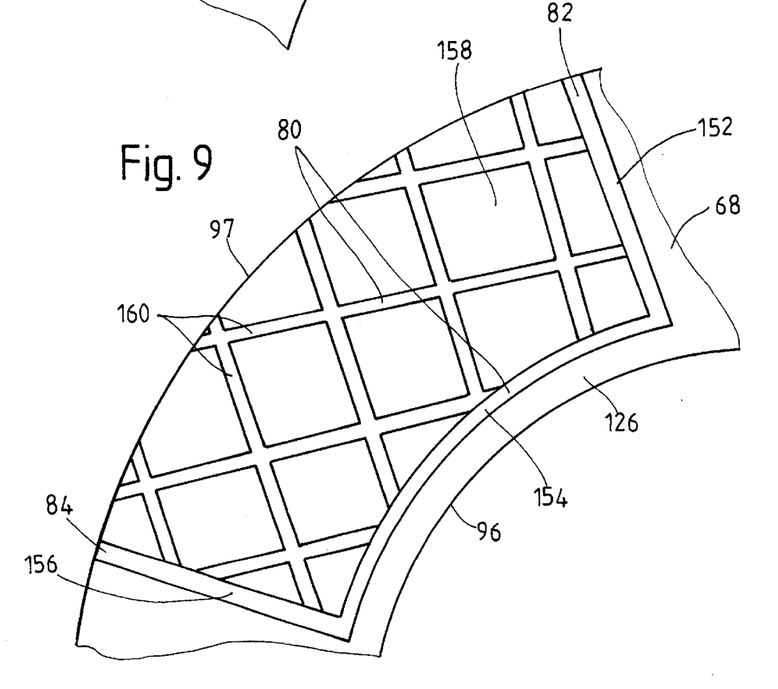
FIG. 9 is similar to FIG. 8 but shows a waffle-shaped groove system.

In the description of the embodiment according to FIGS. 5, 5a, and 5b, it has been assumed that the friction lining 68 has no grooves. Of course, it is also possible for a friction lining designed to implement the principle just described to be provided with grooves 80. Possibly advantageous groove designs are shown in FIGS. 8 and 9, each of which shows a segment of the friction lining 68. Groove system 80 in the friction lining 68 according to FIG. 8 has essentially a zigzag or meandering course, with both an inflow area 82 and an outflow area 84 on the radially outer side 97 of the friction lining 68. The entire groove system 80 is arranged radially within the friction lining 68 so that the lining still has a groove-free friction ring 126 inside the groove 80. As a result, the amount of torque which can be transmitted can be increased, and at the same time a sealing effect with respect to the radial passage of hydraulic fluid is obtained.

As an alternative, the groove 80 can also be designed with a waffle pattern as shown in FIG. 9, preferably in combination with an additional groove 80, enclosing the waffle pattern area, which, proceeding from an inflow area 82 on the radially outer side 97 via a first groove part 152, extends essentially in the radial direction toward the inside until it reaches an intermediate groove part 154, which extends essentially in the circumferential direction. This intermediate grove part 154 in turn leads to a second, essentially radial groove part 156, which leads back on the radially outer side 97 of the friction lining 68 to an outflow area 84. In this design of the friction lining 68, too, a groove-free friction ring 126 remains radially inside the intermediate part 154 of the groove.

Figure 6:
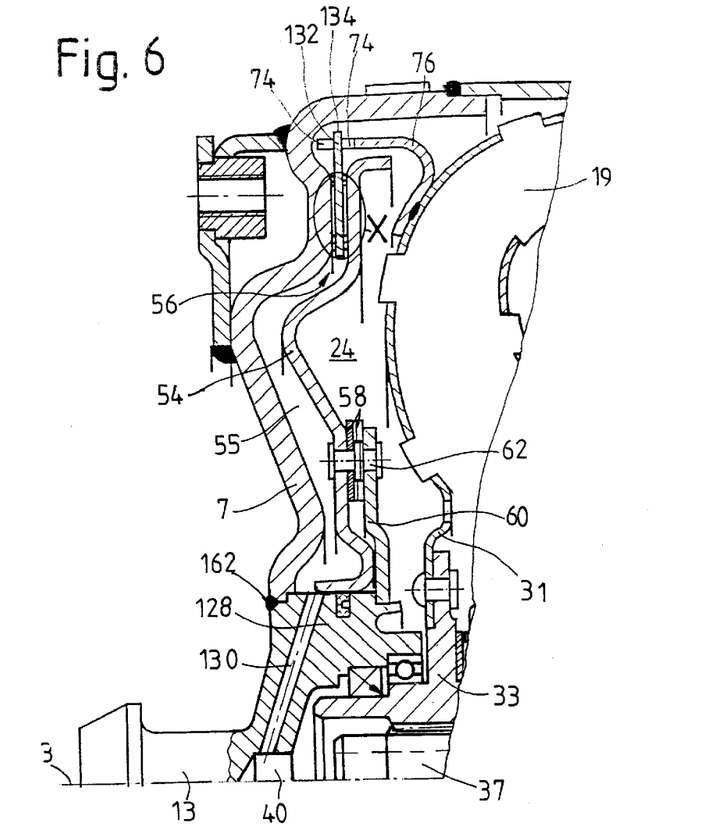
FIG. 6 is similar to FIG. 1, but it shows the how friction linings are attached to a clutch disk, which linings elliptically enclose the rotational axis of the hydrodynamic torque converter and have dynamic pressure points relative to radially adjacent, ring-shaped axial projections.

The designs described so far, especially that according to FIG. 1, show a so-called single-WK lock-up clutch 56, which means that a single friction lining is available to form a friction surface for the transmission of torque. In contrast to this, FIG. 6 shows in conjunction with FIG. 6a a double-WK lock-up clutch 56, which accordingly has a second friction area as a result of a second friction lining. The friction lining 68 on the left in FIG. 6a was a friction area 69, and the opposing friction area 70 is on the converter cover 7. The friction lining 138 on the right side has a friction area 142, and the opposing friction area 146 is on the piston 54. Before this design is discussed in detail, it should be mentioned in advance that it is also conceivable for lock-up clutches to have four or more friction linings. A lock-up clutch of this type is not shown or described here, but it belongs to the state of the art. Reference can be made by way of example to WO 00/03158 (U.S. Pat. No. 6,293, 380), which shows several designs of lock-up clutches with four friction linings. In any event, the lock-up clutch should have an even number of friction linings to prevent the occurrence of any possible balance errors, as will be explained in the following.

Because the clutch 56 is a double-WK lock-up clutch, the bearing journal 13 of the converter housing 5 is designed with a journal hub 128, which is rigidly connected by a weld 162 to the converter cover 7 and which has radial channels 130 with at least one radial component. The latter connect the radially inner transition space 40 to the radially outer chamber 55, located between the converter cover 7 and the piston 54.

Figure 6A:
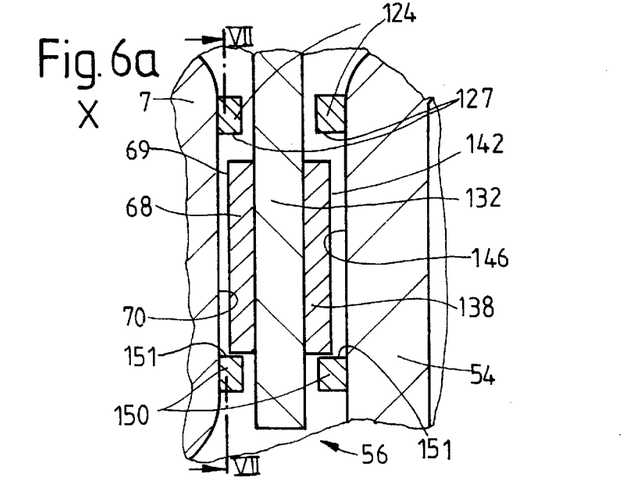
FIG. 6a is an enlarged drawing of detail X in FIG. 6.

In this design, the piston 54 is not equipped with a friction lining. Instead, the friction linings 68, 138 are attached to a clutch disk 132, the radially outer area of which is provided with openings 134, so that it can engage nonrotatably but with freedom of axial movement in opposing openings 74 on the anti-rotation lock 76. Each of the friction linings 68, 138 has its own outer ring-shaped enclosure 124 and inner ring-shaped enclosure 150. The ring-shaped enclosures 124, 150 cooperating with the friction lining 68 as shown on the left in FIG. 6a are attached to the converter cover 7; the comparable ring-shaped enclosures 124, 150 which are assigned to the other friction lining 138, however, are attached to the piston 54. All the ring-shaped enclosures 124, 150, like the ring-shaped enclosure 124 according to FIGS. 5, 5a, and 5b, are dimensioned in the axial direction in such a way that they leave a residual gap 129 with respect to the clutch disk 132 when the lock-up clutch 56 is closed. In this respect, therefore, reference is also made to the diagram of the residual gap 129 in FIGS. 5a and 5b, so that at this point another enlarged detail to illustrate the residual gap 129 between the clutch disk and ring-shaped enclosure does not appear necessary.

Figure 7:
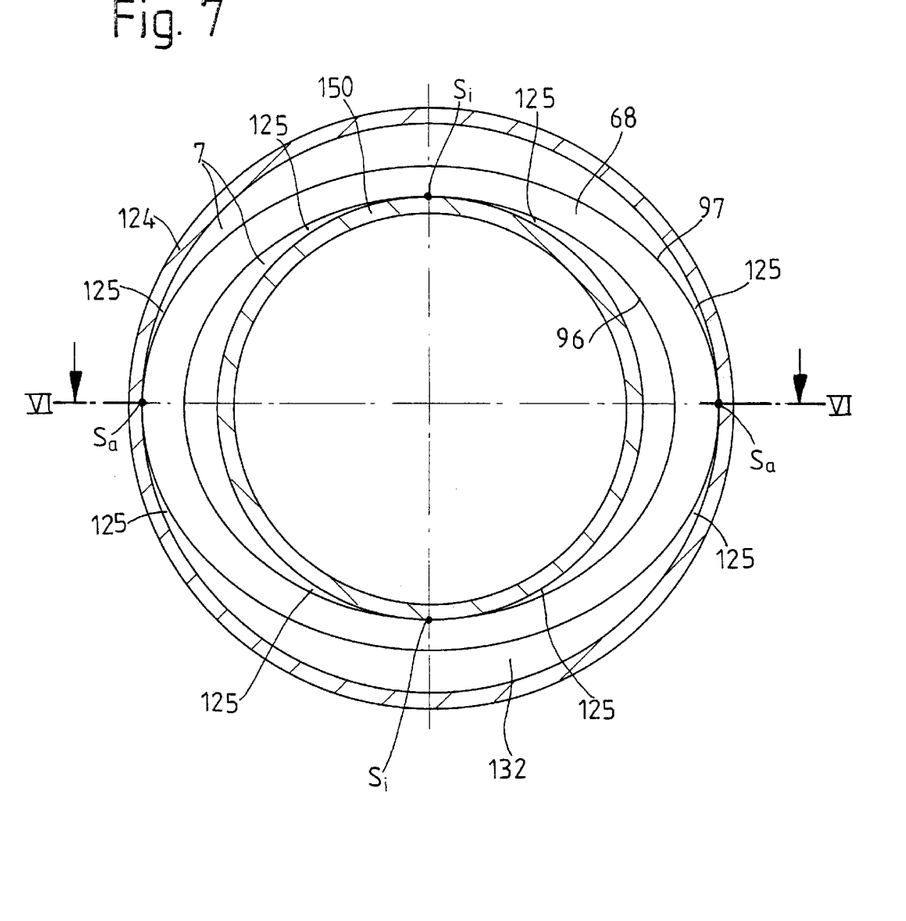

According to the view along intersecting line VII—VII in FIG. 6a, the ring-shaped enclosures 124, 150, as clearly shown in FIG. 7, are essentially circular, whereas the friction linings 68, 138 deviate from the circular. The friction linings 68, 138 are preferably elliptical in shape, where the dimensions of each friction lining 68, 138 are calculated so that the lining has an outside diameter only slightly smaller than the inner sides 127 of the outer ring-shape enclosures 124 at the points $S_a$, which are 180° apart in the circumferential direction. Offset by 90° in the circumferential direction, furthermore, are points $S_i$ on the inside diameters of the friction linings 68, 138 at which the friction linings 68, 138 are only slightly larger than the outer sides 151 of the assigned inner ring-shaped enclosures 150.

The previously mentioned points $S_a$ and $S_i$ are dynamic pressure points as in FIG. 5 described above, by means of which the function of the pump device 100 is achieved. As also in FIG. 5, relative movement of the friction linings 68, 138 with respect to the ring-shaped enclosures 124, 150 attached to the opposing converter component, namely, to the converter cover 7, lead to a positive pressure on one side of the dynamic pressure point $S_a$, $S_i$ in question, whereas they lead to a negative pressure on the circumferentially opposite side. In a corresponding manner, hydraulic fluid is forced out of the flow gap 125 on the positive pressure side, whereas it is drawn in on the negative pressure side, so that the desired forced flow is obtained.

The design according to FIGS. 6, 6a, and 7 therefore functions with respect to its active principle in the same way as the design according to FIGS. 5, 5a, and 5b, but in spite of its simpler design it achieves even better efficiency, because the plurality of pressure points $S_a$ and $S_i$ distribute the forced flow even more uniformly around the circumference. Nevertheless, in order to exclude undesirable balance errors caused by the elliptical shape of the friction linings 68, 138, the second friction lining 138 should be rotated 90° with respect to the first friction lining 68 before being attached to the clutch disk 132. Accordingly, in the case of the second friction lining 138, the outer pressure points $S_a$ as well as the inner pressure points $S_i$ are each rotated 90° with respect to the diagram in FIG. 7.

As a result of the functional principle described here, the design according to FIGS. 6, 6a, and 7 does not necessarily require a groove system 80, but it can be effective to provide such a system as a supplement in order to bring about an even greater increase in the cooling effect, especially in the area over which the friction linings 68, 138 extend. In this context, reference should be made to the previously described FIGS. 8 and 9, where the groove systems 80 shown there can also be provided in this design, at least on one of the friction linings 68, 138.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A lock-up clutch for a hydrodynamic torque converter, said clutch comprising
   a first converter component having at least one first friction area,
   a second converter component having at least one second friction area opposing said at least one first friction area, said first and second friction areas being movable into working connection by an axial engaging movement of said first and second components, said first and second friction areas being movable out of working connection by an axial disengaging movement in the opposite direction from said engaging movement, and
   a pump device comprising a geometric arrangement of said first and second components which is effective to build up a pressure gradient which produces a forced flow of hydraulic fluid through at least one predetermined section of at least one of said first and second friction areas when relative rotation occurs between the first and second converter components, said relative rotation causing said forced flow.

2. A lock-up clutch as in claim 1 comprising at least one groove formed in at least one of said first and second friction areas, said groove having an inflow area and an outflow area for allowing passage of hydraulic fluid through said groove, said groove extending from an inflow side to an outflow side of said at least one of said friction areas, said pump device comprising a baffle element on at least one of said first and second components, said baffle element projecting into a flow path of the hydraulic fluid and having a guide surface which deflects flow into said inflow area, and having a turbulence generator which reduces pressure in said flow path.

3. A lock-up clutch as in claim 2 wherein said first and second friction areas each have a radially inner side and a radially outer side, said baffle element having a radial projection which extends radially inward of said radially inner side and forms said guide surface, said guide surface deflecting said flow into said inflow area of said groove with a radial component.

4. A lock-up clutch as in claim 3 wherein said radial projection has radially maximum inward point which forms a flow separation edge in said flow path, said baffle element approaching said radially inner side as it extends from said flow separation edge toward said outflow area.

5. A lock-up clutch as in claim 4 wherein the outflow side of the friction area ends in the outflow area of the groove.

6. A lock-up clutch as in claim 3 wherein said guide surface has a geometric form which forms a radial extension of the groove.

7. A lock-up clutch as in claim 6 wherein said groove is arc-shaped, said baffle element having an arc-shaped guide surface with the same curvature as the groove.

8. A lock-up clutch as in claim 2 wherein said groove has a crest point from which it extends radially inward in opposite directions toward said inflow area and said outflow area, said baffle element extending radially inward beyond the friction area.

9. A lock-up clutch as in claim 3 wherein said pump device comprises a dynamic pressure generator associated with said guide surface.

10. A lock-up clutch as in claim 9 wherein said dynamic pressure generator forms said inflow area of said groove and has a flow cross-section which converges in a radially outward direction of said groove.

11. A lock-up clutch as in claim 10 wherein said dynamic pressure generator has an essentially edge-free transition between said radially inner side of said friction area and said inflow area.

12. lock-up clutch as in claim 1 comprising at least one groove formed in at least one of said first and second friction areas to allow the passage of hydraulic fluid, said pump device comprising a displacement body provided on one of said first and second converter components and extending into the groove on the other of said first and second converter components, thereby restricting flow in said groove.

13. A lock-up clutch as in claim 12 wherein said groove is dimensioned so that said displacement body can move through said groove without impact when said first and second converter components are in relative motion.

14. A lock-up clutch as in claim 12 wherein said groove comprises an inflow area and an outflow area, said displacement body building up said pressure gradient between said inflow area and said outflow area.

15. A lock-up clutch as in claim 12 wherein said displacement body has an essentially cylindrical shape.

16. A lock-up clutch as in claim 12 wherein said displacement body has a distal end which extends into said groove leaving a predetermined axial clearance.

17. A lock-up clutch as in claim 16 wherein said displacement body is made of a material which abrades to form said axial clearance.

18. A lock up clutch as in claim 12 wherein said displacement body has an outside circumference which allows it to fit in said groove with predetermined amounts of radial clearance.

19. A lock-up clutch as in claim 12 wherein friction area has a radial inner side and a radial outer side, and said groove has an inflow area and an outflow area which open on the same radial side of said at least one of said first and second friction areas.

20. A lock-up clutch as in claim 19 wherein said inflow area and said outflow area open on said radial outer side.

21. A lock-up clutch as in claim 1 wherein
said first converter component has a first rotational axis and a radially inner side defining a first diameter,
said second converter component has a second rotational axis and a radially outer side defining a second diameter which is smaller than said first diameter, said second converter component being arranged inside said first converter component to form a flow gap between said outer wall and said inner wall, said second rotational axis being spaced from said first rotational axis so that said radially outer side approaches said radial inner side to form a dynamic pressure point in said flow gap, whereby,
said pump device is formed by said first and second converter components.

22. A lock-up clutch as in claim 21 wherein said first friction area is larger in radial extent than said than said second friction area and arranged so that said second friction area is in full contact with said first friction area regardless of the relative rotational position of said first and second converter components.

23. A lock-up clutch as in claim 21 wherein said first converter component comprises a ring-shaped enclosure which projects axially toward said second converter component and forms said radially inner side.

24. A lock-up clutch as in claim 21 further comprising a groove provided in at least one of said first and second friction areas.

25. A lock-up clutch as in claim 1 further comprising a clutch disk having opposed axial sides installed axially between said first and second converter components, said first frictional area comprising a first friction lining on the axial side of said clutch disk facing said first converter component, said first friction lining having a radially inner side and a radially outer side, at least one of said radial sides deviating from circular, said first converter component having a ring-shaped enclosure which cooperates with said one of said radial sides to form a flow gap having dynamic pressure points.

26. A lock-up clutch as in claim 26 wherein both of said radial sides deviate from circular, said first converter component having two of said ring shaped enclosures arranged one inside the other, each of said ring-shaped enclosures cooperating with a respective one of said radial sides to form a flow gap having dynamic pressure points.

27. A lock-up clutch as in claim 25 wherein said ring-shaped enclosures is essentially circular.

28. A lock-up clutch as in claim 25 further comprising a second friction lining on the axial side of said clutch disk facing said second converter component, said second friction lining having a radially inner side and a radially outer side, at least one of said radial sides deviating from circular, said second converter component having a ring-shaped enclosure which cooperates with said one of said radial sides to form a flow gap having dynamic pressure points, said second friction lining being rotationally offset from said first friction lining by a predetermined angle.

29. A lock-up clutch as in claim 25 wherein at least one of said radial sides is elliptical.

30. A lock-up clutch as in claim 25 wherein said friction lining and said ring-shaped enclosure have a common rotational axis.

31. A lock-up clutch as in claim 25 wherein each axial side of said clutch disk is provided with one of said friction linings and each of said converter components is provided with one of said ring-shaped enclosures.

32. A lock-up clutch as in claim 25 wherein said friction lining has a groove therein.

33. A lock-up clutch as in claim 32 wherein said groove has an inflow area and an outflow area which both open out on the same radial side of the friction lining.

34. A lock-up clutch as in claim 32 has a meandering shape.

35. A lock-up clutch as in claim 32 wherein said groove has a waffle pattern.

* * * * *